US008539451B2

(12) United States Patent
Ivancic et al.

(10) Patent No.: US 8,539,451 B2
(45) Date of Patent: Sep. 17, 2013

(54) SYSTEMS AND METHODS FOR MODEL CHECKING THE PRECISION OF PROGRAMS EMPLOYING FLOATING-POINT OPERATIONS

(75) Inventors: Franjo Ivancic, Princeton, NJ (US); Malay K. Ganai, Plainsboro, NJ (US); Sriram Sankaranarayanan, Boulder, CO (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 770 days.

(21) Appl. No.: 12/761,575

(22) Filed: Apr. 16, 2010

(65) Prior Publication Data
US 2010/0293530 A1 Nov. 18, 2010

Related U.S. Application Data

(60) Provisional application No. 61/177,299, filed on May 12, 2009.

(51) Int. Cl.
*G06F 9/44* (2006.01)
*G06F 11/00* (2006.01)

(52) U.S. Cl.
USPC .......... 717/126; 717/104; 717/134; 717/135; 714/38.1

(58) Field of Classification Search
None
See application file for complete search history.

(56) References Cited

U.S. PATENT DOCUMENTS

| 5,274,818 | A * | 12/1993 | Vasilevsky et al. | 717/149 |
|---|---|---|---|---|
| 5,862,364 | A * | 1/1999 | Todd | 703/2 |
| 6,173,247 | B1 * | 1/2001 | Maurudis et al. | 703/23 |
| 7,207,027 | B2 * | 4/2007 | Bohm et al. | 716/102 |
| 7,346,486 | B2 * | 3/2008 | Ivancic et al. | 703/22 |
| 7,930,659 | B2 * | 4/2011 | Ivancic et al. | 716/100 |
| 8,108,657 | B2 * | 1/2012 | Barraclough et al. | 712/222 |
| 8,131,532 | B2 * | 3/2012 | Cadambi et al. | 703/22 |
| 2005/0172259 | A1 * | 8/2005 | Bohm et al. | 717/100 |
| 2008/0172551 | A1 * | 7/2008 | Yamashita et al. | 712/227 |
| 2008/0244241 | A1 * | 10/2008 | Barraclough et al. | 712/222 |
| 2009/0216822 | A1 * | 8/2009 | Weinberg et al. | 708/500 |
| 2009/0216823 | A1 * | 8/2009 | Weinberg et al. | 708/504 |

OTHER PUBLICATIONS

Ivancic et al., Model Checking C Programs Using F-Soft, Proceedings of the 2005 International Conference on Computer Design (ICCD'05) published by IEEE, 2005, pp. 1-12.*
Goubault etal., Static Analysis of Numerical Algorithms, in proceedings of SAS'06, LNCS 4134, 2006, pp. 1-17U.*
Josh Milthorpe, Using Interval Analysis to Bound Numerical Errors in Scientific Computing, Oct. 2005, pp. 1-120.*
Evgenija D. Popova, Extended Interval Arithmetic in IEEE Floating-Point Environment, published by Interval Computations, No. 4, 1994, pp. 100-129.*

(Continued)

*Primary Examiner* — Tuan Q. Dam
*Assistant Examiner* — Zheng Wei
(74) *Attorney, Agent, or Firm* — Joseph Kolodka

(57) ABSTRACT

Methods and systems for verifying the precision of a program that utilizes floating point operations are disclosed. Interval and affine arithmetic can be employed to build a model of the program including floating point operations and variables that are expressed as reals and integers, thereby permitting accurate determination of precision loss using a model checker. Abstract interpretation can be also employed to simplify the model. In addition, counterexample-guided abstraction refinement can be used to refine the values of parametric error constants introduced in the model.

19 Claims, 2 Drawing Sheets

(56) References Cited

OTHER PUBLICATIONS

David Goldberg, What Every Computer Scientist Should Know About Floating-Point Arithemtic, published by Acm Computing Serveys vol. 23, No. 1 Mar. 1991, pp. 5-48.*

Ju et al., Interval Arithmetic: form Princples to Implementation, published by Journal of the ACM, vol. 48, issue 5, Sep. 2001, pp. 1038-1068.*

Chen, Y., et al. "Verification of All Circuits in a Floating-Point Unit Using Word-Level Model Checking" Proceedings of the First International Conference on Formal Methods in Computer-Aided Design (FMCAD'96). Nov. 1996. (15 Pages).

Cousot, P., et al. "The Astree Analyzer" European Symposium on Programming (ESOP 2005). vol. 3444 of Lecture Notes in Computer Science. Jun. 2005. pp. 21-30.

Goubault, E., et al. "Static Analysis of the Accuracy in Control Systems: Principles and Experiments" 12th International Workshop on Formal Methods for Industrial Critical Systems (FMICS 2007), Jul. 2007. pp. 1-17.

Kroening, D., et al. "The CPROVER User Manual" Satabs—Predicate Abstraction with SAT. CBMC—Bounded Model Checking. May 2009. pp. 1-85.

O'Leary, J., et al. "Formally Verifying IEEE Compliance of Floating-Point Hardware" Intel Technology Journal Q1'99. May 1999. pp. 1-10.

* cited by examiner

SYSTEMS AND METHODS FOR MODEL CHECKING THE PRECISION OF PROGRAMS EMPLOYING FLOATING-POINT OPERATIONS

RELATED APPLICATION INFORMATION

This application claims priority to provisional application Ser. No. 61/177,299 filed on May 12, 2009, incorporated herein by reference.

BACKGROUND

1. Technical Field

The present invention relates to model checking methods and systems, and more particularly to verifying the precision of programs employing floating point operations.

2. Description of the Related Art

With the growth of multi-core processing and concurrent programming in many key computing segments, as utilized in mobile, server and gaming technologies, effective development and verification tools for concurrent multi-threaded programs have been sought after. At the same time, due to the ubiquitous availability of real-time and cyber-systems that interact with physical environments, there is a great need to develop technologies that target the whole system. Analyzing software for its correctness is a key step in guaranteeing safety of many important real-time and embedded devices, such as medical devices and devices employed in automobiles or airplanes.

Recently, there has been extensive research on model checking software programs. All of these techniques attempt to cover as many different language features as possible, but lately the focus has been on memory correctness issues due to intricate use of pointer indirections, for example. The only model checking tools known to the inventors that handle floating-point operations are based on the CProver infrastructure in accordance with a CBMC (Bounded Model Checker for ANSI-C (American National Standards Institute for C Programming) and C++ programs) and SATABS (SAT (Boolean satisfiability problem)-based Predicate Abstraction). The tool generates a bit-blasted formula for floating-point computations that is translated directly to a SAT solver in the backend. Further, the floating point handling in CBMC has been improved by using counterexample-guided mixed over- and under-approximations when analyzing the bit-blasted formula.

In addition, there are several tools based on abstract interpretation that target the ever growing embedded software domain. These tools focus mostly on floating-point semantics, given their prevalence and importance for the safety of embedded software, such as that used in medical devices, cars, airplanes and so on. These tools include ASTREE (real-time embedded software static analyzer), FLUCTUAT, and PolySpace. Moreover, these tools provide scalable analysis techniques based on abstract interpretation by limiting precision in certain cases, for example due to widening of loops.

SUMMARY

Exemplary embodiments of the present invention address several deficiencies of known systems. For example, with respect to CBMC, the created formula is inherently very precise but, at the same time, does not provide a scalable solution to analyzing programs with floating-point operations. Additionally, in an approach that models floating point operations exactly, it is not possible to discern whether a particular operation causes significant precision loss. Thus, the approach does not analyze for precision loss of computations and only handles certain arithmetic operations. Further, the CBMC infrastructure does not perform any specific floating-point related checks. Moreover, the created formula is designed for a particular rounding-mode only; that is, it does not abstract away the current rounding mode. This requires that the user be aware of the rounding mode, which is not feasible in general. In addition, abstract interpretation analyses are over-approximate and less precise than model checking based techniques according to the exemplary embodiments of the present invention. Furthermore, the abstract interpretation techniques cannot provide counterexamples or witness traces that can be shown to the user for ease of debugging.

In contrast to known approaches, exemplary embodiments of the present invention are scalable and provide a means to assess precision losses due to specific floating point operations performed by a program. In particular, exemplary embodiments of the present invention can soundly model the variability of floating point variables and operations in terms of reals and integers, to permit accurate determinations of any precision loss effected by the program operations. Known model checkers do not directly model the variability in the value of floating-points that can result from precision loss incurred in floating-point representations and operations in a program. In practice, the precision loss due to numerically unstable implementations in hand-written or model-based automatically generated source code are often overlooked by control engineers that design the higher level control models. Exemplary embodiments of the present invention may be employed to find such instabilities in source code.

One exemplary embodiment of the present invention is directed to a method for verifying a program that utilizes floating point operations. In the method, the variability in values of floating point variables and operations in the program can be modeled by employing interval arithmetic, affine arithmetic, or both interval and affine arithmetic, to generate modeling variables composed of reals and/or integers for the floating point variables. In turn, a model for the program that is based on the modeling variables can be generated. Further, model checking can be performed on the model to determine whether there are program instabilities due to loss of precision in floating point representation and operations in the program. Thereafter, error traces for any program instabilities found by the model checking can be reported.

Another exemplary embodiment of the present invention is drawn towards a system for verifying a program that utilizes floating point operations. The system may include a semantic lowering module that is configured to model the variability in values of floating point variables and operations in the program by employing interval arithmetic, affine arithmetic, or both interval and affine arithmetic to generate modeling variables in terms of reals and integers for the floating point variables. The system may further comprise a model checker that is configured to generate a model for the program based on the modeling variables. In addition, the model checker can perform model checking on the generated model to determine whether there are program instabilities due to loss of precision in floating point representation and operations in the program and can report error traces for any program instabilities found.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
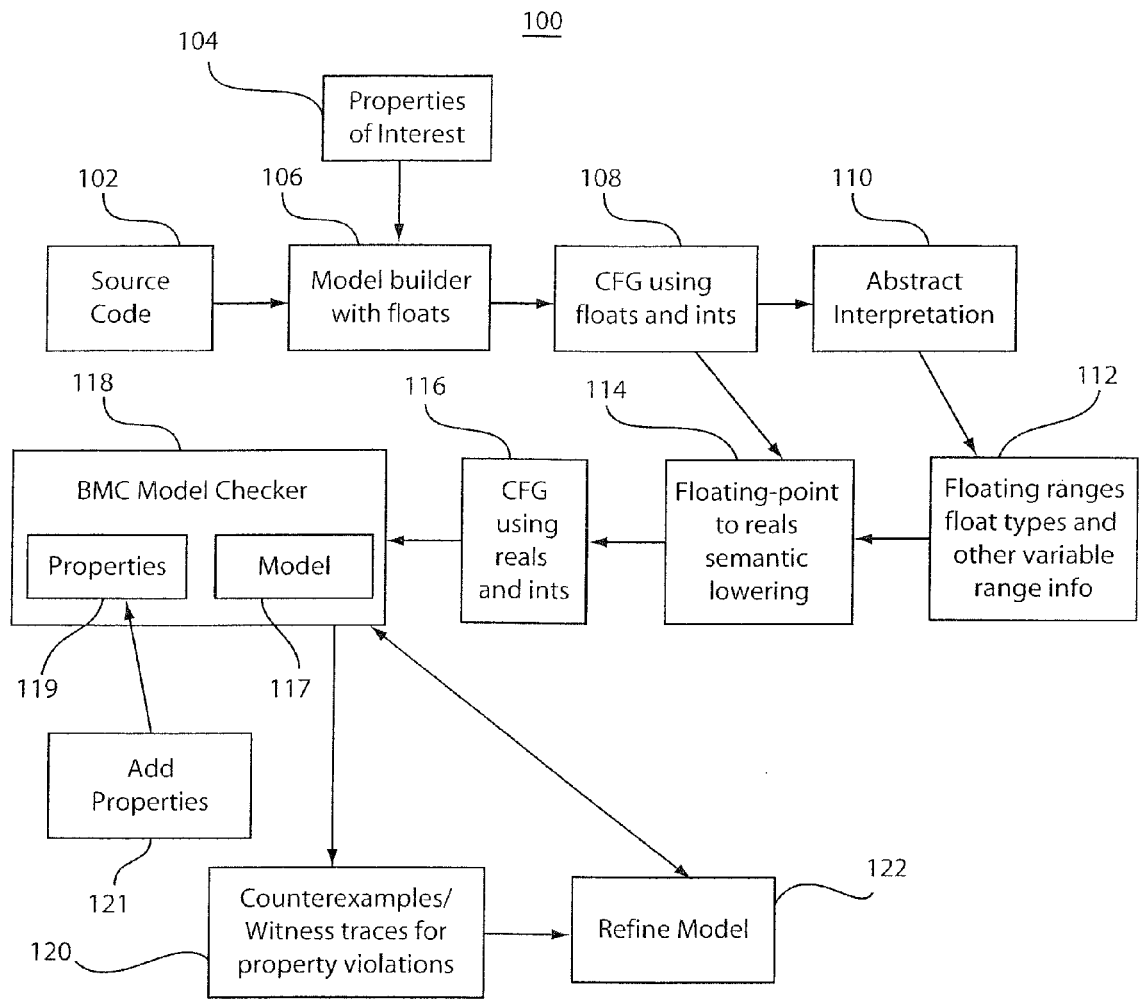
FIG. 1 is a block/flow diagram of a system/method for verifying the precision of a program that utilizes floating point operations in accordance with exemplary embodiments of the present invention.

According to exemplary aspects of the present invention, method and system implementations can be employed to detect program paths that lose significant precision in floating-point computations of a program. To this end, a mixed real-integer model for floating-point variables and operations involving floating-points in a program can be introduced. Floating-point variables in the source code may be associated with auxiliary or modeling variables in the model to track the variability in their values along computations. These modeling variables can include variables in the reals, as well as variables of a small enumerated type denoting whether the floating-point variable is NaN (not a number), some infinity denoted as Inf, or an actual number. For example, the modeling variables that are of type real can represent a bounding interval in the model for its associated floating-point variable, as long as the type of the variable is numeric in that it is not NaN or some Inf. This bounding interval may be used to compute numeric errors, as discussed further herein below.

For each floating point type, such as float, double, long double in the C programming language, exemplary embodiments of the present invention can introduce a parametric constant $\delta$ that can be varied to achieve a desired level of precision in modeling relative numeric errors. By keeping $\delta$ close to the maximal relative error for that type, too many false warnings can be avoided, although this may make analysis more expensive. By increasing $\delta$, the model may be kept sound; however, increasing $\delta$ may introduce spurious warnings due to an overestimation of the relative rounding error. As discussed further herein below, the value of $\delta$ can be refined and optimized using counterexample guided abstraction. In accordance with other exemplary aspects, a parametric constant $\epsilon$ that can be varied to achieve the desired level of precision in modeling absolute numeric errors in the subnormal number range may also be introduced. Moreover, the values of one or more parametric error constants can be increased or decreased based on a user-specified threshold.

As noted above, exemplary embodiments are directed to modeling the variability of floating point variables and operations to detect numeric instabilities. In particular, exemplary embodiments may target detection of numeric instabilities such as non-numeric type error, where an operation results in a non-numeric type, and large numeric error, where the potential error in a floating-point variable is larger than some (user-provided) relative or absolute threshold.

In addition, exemplary embodiments may handle arbitrary assertions that utilize modeling/auxiliary variables described above. Here, pre-designed macros can be provided in exemplary embodiments to facilitate assertion writing. In certain exemplary embodiments, when the system reports a numerically unstable path, the user can utilize this information to improve the stability of the algorithm. Moreover, it should be noted that the modeling presented herein can also be utilized to find other bugs in the program, including buffer overflows, that may depend on floating-point computations.

The modeling described herein below permits efficient use of both abstract interpretation and Satisfiability Modulo Theory (SMT)-based bounded model checking (BMC) techniques. As discussed herein below, abstract interpretation can be employed to find easy proofs (i.e. no errors possible) and to simplify the models before performing BMC, which is used to find concrete computation paths violating numeric stability. In typical embedded software, the numeric algorithmic core computation is often relatively short. This indicates that model checking is potentially feasible, despite the increase in size of models due to modeling variables for floating-points and their updates, which are further described in below.

Referring now in detail to the figures in which like numerals represent the same or similar elements, and initially to FIG. 1, a block/flow diagram of a system/method 100 for verifying the precision of a program that uses floating point operations in accordance with one exemplary embodiment of the present invention is illustrated. In system/method 100, a sound model 108 of the program, which utilizes a set of floating point semantics to perform floating point operations, can be built. The IEEE (Institute of Electrical and Electronics Engineers) 754 standard floating-point semantics are used herein below as an example to illustrate aspects of the present invention. To generate the model 108 of the program, the source code 102 of the program and the properties of interest 104, which may be provided by a user, can be input into a model builder 106 that considers floating point operations. The model 108 is based on a control-flow graph (CFG) representation that includes floating and integer variables. As discussed further below, the F-SOFT tool can be modified and used as a platform for the model builder 106 and for other elements of system/method 100.

It may be assumed here that hardware implementations of the floating point operations according to IEEE 754 are correct. This implies a precise but over-approximate handling of the various floating-point rounding modes that may be applicable at any given time of execution.

The model or CFG 108 may undergo abstract interpretation in module 110 to determine float ranges, float types and other variable range information 112, which are input to a floating-point to reals semantic lowering module 114 along with the CFG 108. The semantic lowering module 114 and its operations are discussed in more detail below with respect to FIG. 2. Based on the CFG 108 and information 112, the semantic lowering module 114 may generate another model 116 of the program that is based on a control-flow graph representation that includes variables in the real domain and the integer domain, and further includes constraints that limit the permitted executions. All floating-point variables and related operations may be lowered to this model 116 in a sound manner, thereby guaranteeing that any problem in the floating-point program is still reproducible in the model. The model 116 may also include property monitors that relate to potential runtime problems, including large precision loss of the floating-point computations. It can be shown that, in comparison to abstract interpretation based techniques for analyzing programs with floating-point operations discussed above, a higher quality of output results providing improved precision can be achieved using the model 116.

It should be noted that a sound and static abstract interpretation based analysis of the generated model 116 can be made to prove certain properties of interest and simplify the model. The simplification may involve removal of resolved properties, removal of unreachable model statements, especially in the precise model of IEEE floating-point semantics, and program slicing to further remove unneeded statements from the model after simplification.

Further, from model 116, a model 117 suitable for analysis using BMC based on SMT solvers can be generated by model checker 118. The solvers can analyze the model using model checking techniques that reason about variables in the mixed domain of integers and reals. In an exemplary system, an HBMC (high-level BMC) 118, which may be based on SMT solvers, can be employed to analyze the model 117. The solvers may also report whether conditions provided in the properties of interest 104, such as precision conditions, are satisfied. As discussed further herein below, properties 119, which may, for example, comprise reachability properties, can be automatically generated to test for instabilities. Further, the solvers may output counterexamples/witness traces for property violations 120 with respect to the properties of interest 104/properties 119. In particular, the model checker block 118 can be configured to perform model checking on the model 117 to determine whether there are program instabilities due to loss of precision in floating point representation and operations in the program, as discussed further herein below. In addition, an optional refinement module 122 can be employed to dynamically refine the model 117 by varying and optimizing parametric constants introduced by the semantic lowering module 114. For example, witness traces 120 output by the model checker 118 can be utilized by the refinement module 122 to select suitable values of the parametric constants and thereby eliminate spurious counterexamples in the report 120, as discussed in more detail below.

The modeling and analysis system/method 100 can then be utilized to analyze source code of an application on a general purpose computer, for example, including memory, a disk, and a CPU (central processing unit). Bugs in an application that are discovered can be reported to the user, or removed from the application by the introduction of additional runtime monitoring statements, for example, to provide a numerically stable application to be run on a computer. In addition, numerically unstable computations can reported to the user, who can then use the report to remove the unstable computations.

It should be understood that embodiments described herein may be entirely hardware or including both hardware and software elements. For example, modules 106, 110, 114 and 118 can be implemented in hardware and software elements. In a preferred embodiment, the present invention is implemented in hardware and software, which includes but is not limited to firmware, resident software, microcode, etc.

Embodiments may include a computer program product accessible from a computer-usable or computer-readable storage medium providing program code for use by or in connection with a computer or any instruction execution system. A computer-usable or computer readable storage medium may include any apparatus that stores the program for use by or in connection with the instruction execution system, apparatus, or device. The medium can be magnetic, optical, electronic, electromagnetic, infrared, or semiconductor system (or apparatus or device). The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code including system/method blocks described herein may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Returning to the source code 102 of system/method 100, below is an exemplary source code, Algorithm 1, that may be input to the model builder 106 to be analyzed by system/method 100 to verify the precision of its floating point operations. Algorithm 1 is a small instructive motivating example that shows a program with significant precision loss. The function CTRLTEST first computes the expression $$x = \frac{c_1 b_2 - c_2 b_1}{a_1 b_2 - a_2 b_1},$$

and returns TRUE if the answer is non-negative. For the input $a_1=37639840$, $a_2=29180479$, $b_1=-46099201$, $b_2=-35738642$, $c_1=0$, and $c_2=1$ using single-precision floating point arithmetic (float), the program computes the value $x=0.343466$ on a PC (personal computer) running Linux using the GCC (GNU compiler collection) compiler in default rounding mode. It has been shown that the same computation results in $x=1046769994$ on an UltraSpare architecture. However, mathematically speaking, the computation of x should result in $x=-46099201$.

TABLE 1

| Algorithm 1 Motivating example |
| --- |
| Output: returns TRUE if $\frac{c_1 b_2 - c_2 b_1}{a_1 b_2 - a_2 b_1}$ is non-negative; FALSE otherwise. |
| 1: procedure CTRLTEST (floats a1, a2, b1, b2, c1, c2) |
| 2:   float x = (c1*b2−c2*b1)/(a1*b2−a2*b1); |
| 3:   if x ≧ 0.0f then return TRUE; |
| 4:   else return FALSE; |
| 5:   end if |
| 6: end procedure |

The problem observed in this example is known is due to cancelation effects. Because the sign determines the output of the function CTRLTEST, which may lead to a downstream choice of a different controller being activated, such an unstable computation may result in compromised safety of embedded and real-time devices. It should be noted that the CBMC tool is able to analyze this small example and produces a value $x=0.343466$. However, the CBMC tool is not able to uncover that this computation is numerically unstable because it models the bit-precise floating-point values, but not the variability in these values due to loss in numerical precision. Furthermore, the provided answer relies on a particular rounding mode that is only under control of the program under analysis.

With regard to the model builder 106, in accordance with exemplary embodiments of the present invention, the F-SOFT tool can provide a platform for implementing the model builder 106. For example, the F-SOFT tool offers a combined infrastructure that builds a single model that is utilized by both abstract interpretation techniques and model checking techniques. The tool analyzes source code written in C or C++ for user-specified properties, user-provided interface contracts, or standard properties such as buffer overflows, pointer validity, string operations, etc. It should be noted that each one or more of these exemplary properties can be included in the properties of interest 104. Extensions of F-SOFT to concurrent programs have been developed. The central role that abstract interpretation plays in F-SOFT is to eliminate easy proofs and permit model simplifications to generate models that are small enough such that they can be passed on to a model checker in the backend. F-SOFT supports both unbounded model checking as well as BMC techniques, where a BMC can utilize either a SAT-solver or an SMT-solver for the analysis.

As discussed herein below, critical improvements to the F-SOFT infrastructure can be made to reason precisely about floating-point operations in a scalable fashion using, for example, an SMT-solving backend. In prior systems, floating-point operations were treated as nondeterministic operations, sometimes resulting in an excessive number of incorrect warnings. Thus, exemplary embodiments of the present invention provide a more precise and scalable analysis to address safety concerns related to embedded devices.

Figure 3:
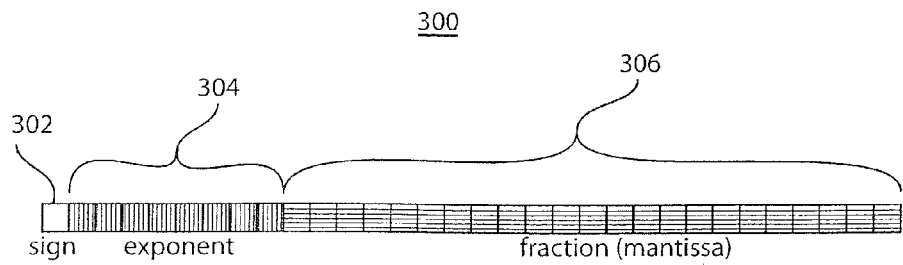
FIG. 3 is a block diagram of a floating-point number format in accordance with the IEEE 754 standard.

To illustrate exemplary aspects of the present invention, source code is analyzed herein with respect to the binary formats of the new IEEE 754-2008 standard, which are largely based on the IEEE 754-1985 norm. In the IEEE 754-2008 standard, as shown in FIG. 3, the general layout of a floating-point number is in sign-magnitude form 300, where the most significant bit is a sign bit 302, the exponent is stored as a biased exponent 304, and the fraction is the significand 306 stored without the most significant bit. The exponent is biased by $(2^{e-1})-1$, where e is the number of bits used for the exponent field. For example, to represent a number which has an exponent of 17 in an exponent field 8 bits wide, 144 is stored since $17+(2^{8-1})-1=144$. In most cases, as mentioned above, the most significant bit of the significand is assumed to be 1 and is not stored. This case occurs when the biased exponent $\eta$ is in the range $0<\eta<2^{e-1}$, and the numbers so represented are called normalized numbers. If the biased exponent $\eta$ is 0 and the fraction is not 0, the most significant bit of the significand is implied to be 0, and the number is said to be de-normalized or sub-normal. The remaining special cases are: a) if the biased exponent is 0 and the fraction is 0, the number is ±0 (depending on the sign bit); b) if the biased exponent equals $2^{e-1}$ and the fraction is 0, the number is ±∞ (depending on the sign bit), which is denoted as Inf (infinity) or −Inf here; and c) if the biased exponent equals $2^{e-1}$ and the fraction is not 0, the number represents the special floating-point value called not a number (NaN). It should be noted that the standard defines two zeros, namely 0 and −0. The two numbers behave similarly with a few differences. For example, dividing a positive number by 0 results in ∞, whereas dividing a positive number by −0 results in −∞.

For ease of presentation of the IEEE standard in this section, only two floating-point formats defined in the standard are discussed here; namely: single-precision (specified using the keyword float in C/C++) and double-precision (specified using the keyword double in C/C++). Single-precision defines that a floating-point number is represented using 32 bits, of which e=8 are used for the exponent and 23 bits for the fraction. FIG. 3 shows the single-precision layout of the standard. The smallest positive normalized number representable thus is $2^{-126}$ which is about $1.18 \cdot 10^{-38}$, while the largest number is $(2-2^{23}) \cdot 2^{127}$ which is about $3.4 \cdot 10^{38}$. For double-precision, on the other hand, the standard prescribes the use of 64 bits to store numbers, of which e=11 represent the biased exponent, and 52 bits are used for the fraction. The largest number representable in double-precision is about $1.8 \cdot 10^{308}$.

With regard to rounding, the IEEE 754-2008 standard defines five different rounding modes for each floating-point operation. There are two modes that "round to nearest" neighboring floating point number, where a bias can be set to "even numbers" or "away from zero" when the operation lands exactly midway between two representable floating point numbers. The other three rounding modes are "rounding towards zero," "rounding towards ∞" and "rounding towards −∞." The standard defines that every arithmetic operation be calculated as precisely as possible before rounding it using the current rounding mode. Computations are thus performed using longer bit-lengths and are truncated when storing the results after rounding only. While the absolute error may be large for large absolute values, the maximum relative error due to operations and rounding thus is constant for resulting values in the normalized number range. The relative error for normalized numbers is $2^{-23}$ for single-precision and $2^{-52}$ for double-precision.

To provide gradual underflow for very small numbers in absolute terms, the standard introduced denormalized or sub-normal numbers. These numbers lie between the smallest positive normal number and zero, and their negative versions. This feature is meant to provide a slowing of the precision loss due to cancelation effects around zero. The main advantage of defining subnormal numbers in the standard is that it guarantees that two nearby but different floating-point numbers always have a non-zero distance. Hence, any subtraction of two nearby but different floating-point numbers is guaranteed to be non-zero, which cannot be guaranteed without subnormal numbers. However, it should be noted that operations that result in numbers in the subnormal number range can have very large relative errors.

With regard to operations, the standard defines many details about the precision, expected results and exception handling for a variety of operations such as arithmetic operations (add, subtract, multiply, divide, square root, . . . ), casting conversions (between formats, to and from integral types, . . . ), comparisons and total ordering, classification and testing for NaN, and many more. To illustrate exemplary aspects of the present invention, the description provided herein below focuses on arithmetic operations and casting operations, in particular, using the rounding precision for operations prescribed by the standard.

Returning to the F-SOFT tool, some details concerning software modeling relevant to the automatic construction of a symbolic model for arbitrary C/C++ programs are described. F-SOFT analyzes safety properties in C/C++ programs by checking whether certain statements are reachable from an entry point of the program. A large set of programming bugs, such as array bound violations, use of uninitialized variables, memory leaks, locking rule violations, and division by zero, can be formulated into reachability problems by adding suitable property monitors to the given program.

F-SOFT begins with a program in full-fledged C/C++ and applies a series of source-to-source transformations into smaller subsets of C, until the program state is represented as a collection of simple scalar variables and each program step is represented as a set of parallel assignments to these variables. A control-flow graph (CFG) representation is used here as an intermediate representation.

Figure 2:
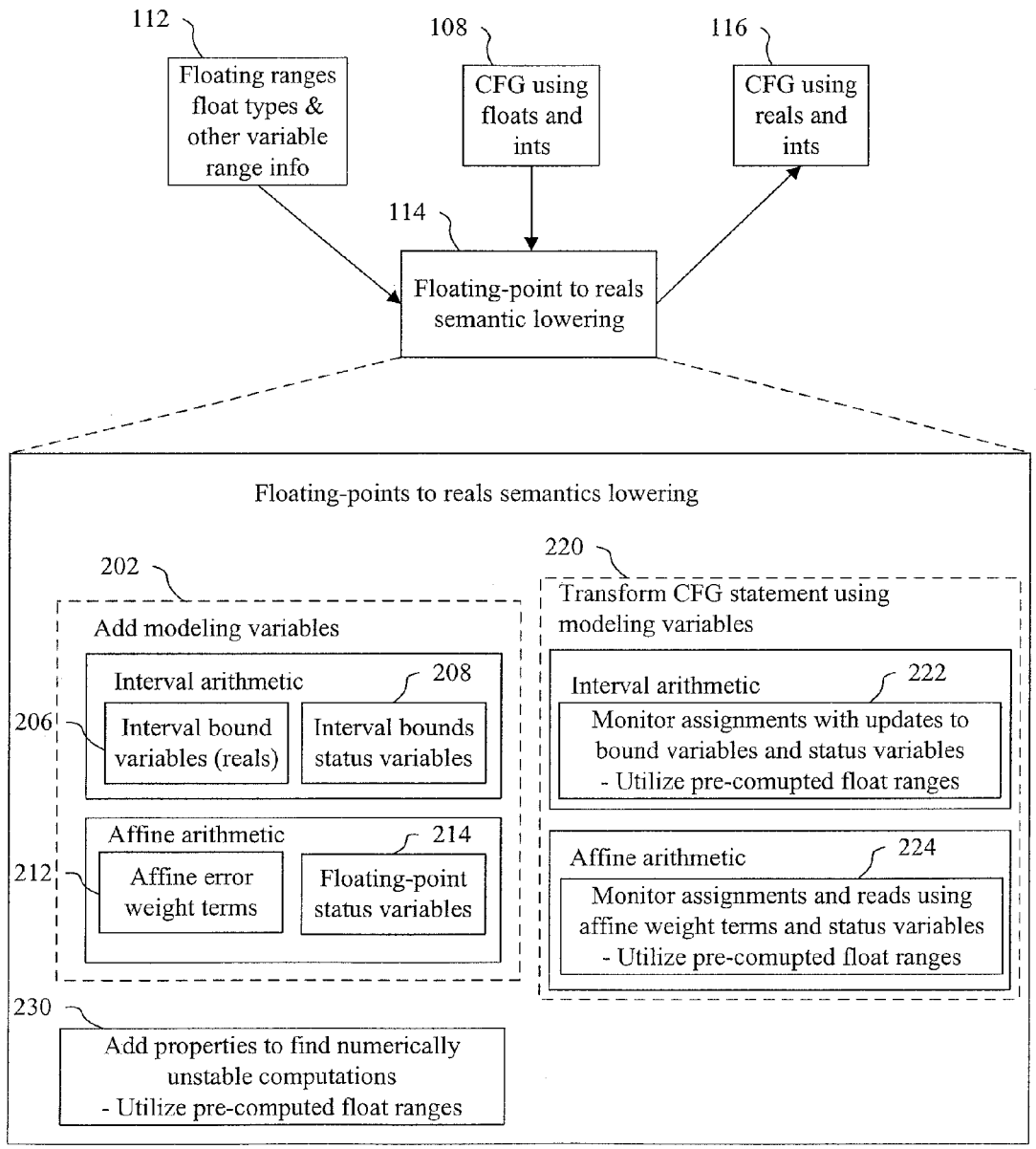
FIG. 2 is block/flow diagram of a system/method for semantically lowering floating-point variables and operations to reals and integers in accordance with exemplary embodiments of the present invention.

Returning now to the semantic lowering block 114 of system/method 100 with reference to FIG. 2, as discussed further herein below, block 114 may model the variability in values of floating point variables and operations in the program. For example, the semantic lowering block 114 may add modeling variables to the CFG 108 in block 202 and may transform CFG 108 statements, in block 220, using the modeling variables by employing interval arithmetic and/or affine arithmetic, each of which is briefly described herein below, followed by a description of how these arithmetic may be applied in accordance with exemplary aspects of the present invention. As discussed herein below, the modeling variables can be composed only of semantic reals and integers. It should be noted that "verification arithmetics" is defined herein as being interval arithmetic, affine arithmetic or both interval and affine arithmetic.

In interval arithmetic (IA), instead of defining arithmetic operations on individual numbers, IA defines arithmetic operations on intervals on reals extended with $\infty$ and $-\infty$ instead. For a variable x, an interval is introduced and written as $[\underline{x},\overline{x}]$, where $\underline{x}$ denotes the lower bound of the interval and $\overline{x}$ denotes the upper bound of the interval. It should be noted that the bounds can be real or $\pm\infty$. To provide sample arithmetic operations in accordance with IA, the addition or multiplication of two intervals $[\underline{x},\overline{x}]$, $[\underline{y},\overline{y}]$ are considered and are defined as $$[\underline{x},\overline{x}]+[\underline{y},\overline{y}]=[\underline{x}+\underline{y},\overline{x}+\overline{y}] \text{ for addition, and}$$

$$[\underline{x},\overline{x}]\cdot[\underline{y},\overline{y}]=[\min(\underline{xy},\underline{x}\overline{y},\overline{x}\underline{y},\overline{xy}),\max(\underline{xy},\underline{x}\overline{y},\overline{x}\underline{y},\overline{xy})] \text{ for multiplication.}$$

In a non-disjunctive analysis setting, division by an interval that includes zero is defined to result in the interval $[-\infty, \infty]$.

In turn, affine arithmetic (AA) can be considered as an improvement over IA, as it is able to track dependencies between variables, thus often providing less over-approximate results than IA. In AA, a quantity x is represented as a first-degree ("affine") polynomial $$x_0+x_1\cdot\epsilon_1+x_2\cdot\epsilon_2+\ldots+x_k\cdot\epsilon_k,$$

where $x_0, x_1, \ldots, x_k$ are known real numbers called weights, and $\epsilon_1, \epsilon_2, \ldots, \epsilon_k$ are error variables, whose value is only known to be in $[-1,1]$. Each error variable $\epsilon_i$ represents some source of uncertainty or error in the quantity x—which may come from input data uncertainty, formula truncation, or arithmetic rounding. An error variable that appears in two quantities x and y implies that their values are partially correlated.

As an example, consider $x=3+\epsilon_1$ and $y=2-\epsilon_1$. This implies that $x\in[2,4]$ and $y\in[1,3]$, and, in IA, $x+y\in[3,7]$. However, using AA, the result of x+y is very close to 5; namely $5+w\cdot\epsilon_2$, where w, $\epsilon_2$ are introduced to model arithmetic rounding, for example, and w would be a very small quantity representing machine precision.

In accordance with exemplary aspects of the present invention, IA and/or AA approaches can be employed to generate a model of a program employing floating point operations. In particular, an IA-based approach can be used for generation of a model for model checking purposes to provide scalability of model checking. The increased path-sensitivity in this application should be able to provide precision that is lost in an abstract interpretation-based setting. In addition, savings can be achieved by combining abstract interpretation with model checking, as discussed further herein below. For an abstract interpretation portion of the modeling tool flow, such as in, for example, block 110, an AA-based analysis can be utilized.

As noted above, the floating-point to reals semantic lowering block 114 can include adding modeling variables in block 202. In particular, interval bound variables and interval bounds status variables can be added in blocks 206 and 208, respectively, to CFG 108 to generate CFG 116 using interval arithmetic. Here, the interval bound variables can model floating point variables provided in CFG 108. For example, to model floating point operations, a number of monitoring or modeling variables for each floating point variable f can be introduced in block 206. $\underline{f}$ is used to represent the lower interval bound variable for floating point variable f, and $\overline{f}$ is used to represent the upper interval bound variable for floating point variable f. The modeling variables $\underline{f}$ and $\overline{f}$ are semantically reals, and not floating point variables, that delineate the variability of the value of the corresponding floating point variable f. To model special floating point values such as NaN and $\pm$Inf, two additional floating point status variables $\check{f}$, $\hat{f}\in F$, are introduced where $$F:=\{NaN,Inf,-Inf,Number\}$$

represents the set of values that floating point status variables may take. The variable $\check{f}$ represents the floating point status of the lower interval bound variable $\underline{f}$, and $\hat{f}$ represents the floating point status of the upper interval bound variable $\overline{f}$. It should be noted that F does not distinguish between zero or normalized or denormalized floating point numbers, which all carry the status Number.

The value of the variable $f\in R$ is relevant only if the corresponding type variable $\check{f}=$Number. This produces the constraint $$\check{f}=\text{Number}\rightarrow f\geq\underline{f},$$

and a corresponding constraint for the upper bound:

$$\hat{f}=\text{Number}\rightarrow f\leq\overline{f}.$$

As stated above, the floating-point to reals semantic lowering block 114 can also include transforming CFG statements of CFG 108, in block 220, using the modeling variables added in block 202. In particular, in block 222, assignments of variables in the program can be monitored with updates to bound variables and status variables by utilizing pre-computed float ranges generated in the abstract interpretation block 110. For example, for every arithmetic floating-point operation, such as $z:=x+_F y$, additional statements are added to the model of the program that update the related monitoring variables. In the sequel, the following notation for modeling rounding in the model can be employed: $\downarrow(x)$ models rounding of x towards $-\infty$, whereas $\uparrow(x)$ models rounding towards $\infty$ using a rounding precision that is based on the compile-time floating point type of the expression. Furthermore, $\sigma,\lambda\in R$ can be used to represent the permitted bounds of a particular floating point type; that is, a value less than $\sigma$ can be treated as $-$Inf, whereas a value larger than $\lambda$ can be treated as Inf.

It should be noted that the values $\sigma$, $\lambda$ and the definition of $\downarrow,\uparrow$ are dependent on the actual compile-time type of the floating point used. The following exemplary floating point types can be supported:

$$T:=\{\text{float,double,long double}\}.$$

For the above-referenced statement $z:=x+_F y$, the following additional statements, which may be written using the C ternary operator ?, can be introduced in the model 116:

$z := \downarrow(\underline{x} + \underline{y})$, $\overline{z} := \uparrow(\overline{x} + \overline{y})$, $\tilde{z} := (\tilde{x} = NaN \vee \hat{y} = NaN)?NaN:$ $(\tilde{x} = Inf \wedge \hat{y} = -Inf)?NaN:$ $(\tilde{x} = -Inf \wedge \hat{y} = Inf)?NaN:$ $(\tilde{x} = Inf \vee \hat{y} = Inf)?Inf:$ $(\tilde{x} = -Inf \vee \hat{y} = -Inf)?-Inf:$ $(\underline{z} < \sigma)?-Inf: (\overline{z} > \lambda)?Inf:$ Number, Similar statements for $\hat{z}$ can be added in a similar manner as understood by those of ordinary skill in the art in view of the teachings provided herein, but are omitted here for brevity purposes.

While the update to the floating point status variables is quite complex, it should also be noted that these variables may only range over F. Often, these updates can be simplified by an a priori abstract interpretation step in block 110 that computes invariants, such as an over-approximate interval, in block 112 for each floating point variable, thus permitting resolution of many of the conditions before generating this complex update function. Importantly, the type of the original floating point variables in the program is changed in the model to be an integer or of type real.

In addition to handling arithmetic operations when building the model, the semantic lowering block can also model casting operations between floating point types and between floating point variables and integral type variables. Supported casting operations can include casting from lower precision floating point types to higher precision ones, such as a cast from float to double, which is precise and does not lose any precision. Other such casting operations can include casting from higher precision types to lower precision types by rounding using $\downarrow$ for $\underline{f}$ and $\uparrow$ for $\overline{f}$, which may also cause a change in the floating point type variables from Number to ±Inf. Casting from an integer variable to a floating point variable may also be performed in block 114, which may also entail the use of the rounding modes. Further, block 114 can also perform casting from floating point to some integer variable, which is only well defined if the variable is large enough to represent the value of the floating point; otherwise, the result is undefined and specified as a nondeterministic value in the range of the integral type variable.

As stated above, the semantic lowering block 114 may also employ affine arithmetic to add modeling variables in block 202. Specifically, affine error weight terms 212 and floating-point status variables 214 can be added to the CFG model 108 to generate CFG model 116. In addition, in block 224, assignments of variables and reads in the program can be monitored using the affine weight terms, the floating point status variables and pre-computed float ranges in block 112 provided by abstract precision block 110.

For example, as indicated above, AA quantities represent ranges over some field. In the following discussion, angular brackets are used to denote symbolic variables that represent ranges in affine arithmetic. Each affine arithmetic variable $<x>$ is the summation of a central value $x_0 \in \mathbb{R}$ and a number of affine terms $x_i \epsilon_i$, where $x_i \in \mathbb{R}$ is a coefficient and $\epsilon_i$ is a variable that ranges over $[-1, 1]$. Formally, $<x>$ is written as $<x>=x_0+\Sigma_{i=1 \ldots k} x_i \epsilon_i$. The interval represented by $<x>$ is simply $[<x>]:=[x_0-\Sigma_{i=1 \ldots k} |x_i|, x_0+\Sigma_{i=1 \ldots k} |x_i|]$.

To account for computation errors, floating-point rounding errors are considered. As opposed to interval arithmetic, considering floating-point rounding errors in affine arithmetic is a little bit more involved. One possible approach may comprise outwardly rounding each of the coefficients in a new affine quantity; however, the dependencies of the affine quantity on the rounding errors would be lost. In order to maintain as much information as possible, the rounding errors for each affine term may instead be computed separately and, then, the errors may be accumulated into a new affine term.

For example, for two affine variables $<x>,<y>$, $<x>+<y>=(x_0+y_0)+\Sigma_{i=1 \ldots k}(x_i+y_i)\epsilon_i+\phi\epsilon_{k+1}$, where $\epsilon_{k+1}$ is a new affine term and $\phi$ captures all the floating-point rounding errors. In other words, an affine term can be associated with the computation error that occurs at each operation. These errors and, also, the affine terms which model uncertain parameters in the system can be tracked along a computation sequence. Therefore, at each point in time, how each uncertainty affects the current state of the system can be determined.

It should be noted that although the computation of the lower bound and upper bound variables for f in the example provided for the application of affine arithmetic in block 202 is different than the computation of lower and upper bound variables for the example provided for application of interval arithmetic in block 202, the floating point status flag can be updated in the affine arithmetic application as described above with respect to the application of interval arithmetic in block 202.

To illustrate other ways in which IA can be employed in block 114, an example is provided in which IA is utilized to model rounding for floating point operations, which has been denoted above as $\uparrow$ and $\downarrow$, using weight terms. For example, with regard to rounding normalized numbers, as mentioned above, the relative precision for normalized numbers is fixed given a particular floating-point type $t \in T$ and is quite precise. For every floating-point precision type $t \in T$, a parametric error constant $\delta_t$ that is larger than or equal to the worst-case relative error for the floating-point type t in a normalized number range can be introduced. Here, the parametric constant $\delta_t$ is another means by which the variability of one or more modeling variables can be accounted for in accordance with exemplary aspects of the present invention. $\delta$ can be written in lieu of $\delta_t$ when the floating-point type is known or inconsequential.

By keeping $\delta_t$ close to the maximal relative error, an excessive number of false warnings can be avoided. However, it should be noted that keeping $\delta_t$ close to the maximal relative error may make individual computations during the analysis stage more expensive. By increasing $\delta_t$, the analysis model is ensured to be sound, although increasing $\delta_t$ may introduce false warnings due to an overestimation of the relative rounding error.

Thus, for the normalized number range, rounding functions $\downarrow_n, \downarrow_n, \uparrow_n: \mathbb{R} \rightarrow \mathbb{R}$ are defined as $$\downarrow_n(x) := \begin{cases} x(1-\delta): x \geq 0, \\ x(1+\delta): x < 0. \end{cases}$$

and $$\uparrow_n(x) := \begin{cases} x(1+\delta): x \geq 0, \\ x(1-\delta): x < 0. \end{cases}$$

For ease of presentation, the floating-point type annotation to the rounding functions is avoided, although these rounding functions in fact are floating-point precision type specific.

With regard to rounding sub-normal numbers, it should be noted that the relative error model of sub-normal numbers is ineffective, as the relative error can be 1 inside the sub-normal number range. Consider the fact that a number that is smaller than the smallest sub-normal number may be rounded down to 0. In exemplary embodiments of the present invention, various ranges of sub-normal numbers can be introduced and treated separately by applying a possibly different error weight for each range. However, for illustration purposes and ease of understanding, absolute error modeling in the combined sub-normal number range is employed herein below. A parametric error constant $\epsilon_t$ can be chosen in block 114 for t∈T that is larger than or equal to the largest absolute error in a floating-point type specific subnormal number range. Further, the absolute error can be used for operations resulting in values in the sub-normal number range. Here, the parametric constant $\epsilon_t$ is another means by which the variability of one or more modeling variables can be accounted for in accordance with exemplary aspects of the present invention.

Rounding function $\downarrow_s, \uparrow_s : R \to R$ for the subnormal number range as:

$$\downarrow_s(x) := x - \epsilon, \text{ and } \uparrow_s(x) := x + \epsilon.$$

The main disadvantage of this rounding model is that most operations that could result in a sub-normal number range yield intervals that include 0. This may lead to a large estimated error should this interval be used as a denominator in a division in a non-disjunctive analysis setting. To avoid the spilling of interval ranges to straddle zero, a rounding function that preserves the sign of the bounding variable can also be defined. Additionally, as mentioned above, further splitting the sub-normal number range into regions and applying a possibly different corresponding relative or absolute error to each region can provide better accuracy. Here, the relative or absolute error can correspond to the largest absolute error in a floating-point type specific subnormal number range region.

It should also be noted that exemplary embodiments of the present invention can combine rounding functions for normalized and sub-normal numbers in block 114. A straightforward solution to combining the rounding functions $\uparrow_n, \uparrow_s$ to yield a combined rounding function $\uparrow$ in accordance with exemplary embodiments would be to compute the result of an operation, and based on the result select the appropriate rounding function to use. For example, if the result is a normalized number then $\uparrow_n$ is used, and if the result is a sub-normal number then $\uparrow_s$ is used. The rounding down functions for normalized or sub-normal numbers can be similarly chosen if the result is a normalized or sub-normal number, respectively. However, this approach would introduce additional floating-point type specific constants delineating the boundary between normalized numbers and sub-normal numbers. In addition, each expression in this approach would utilize one further ITE (if-then-else) to denote this choice.

In order to simplify the expressions for analysis, block 114 can define $\downarrow, \uparrow : R \to R$ to be $$\downarrow := \downarrow_n + \downarrow_s, \text{ and } \uparrow := \uparrow_n + \uparrow_s.$$

It should be further noted that this is sound modeling because both error types are always enforced although only one is applicable at each point in time. Furthermore, it should also be noted that the absolute error $\epsilon$ introduced in $\uparrow_s, \downarrow_s$ is very small and is quite immaterial as long as numbers are not within close distance to the sub-normal range.

It should also be understood that the semantic lowering module 114 can also be configured to add properties, in block 230, to find numerically unstable computations by utilizing pre-computed float ranges 112 provided by abstract interpretation block 110. Thereafter, model checker block 118 can be configured to find concrete computation paths that violate numeric stability. In this way, for example, block 118 can perform model checking on the model 117 to determine whether there are program instabilities due to loss of precision in floating point representation and operations in the program.

For example, referring again to the example provided by Algorithm 1 in Table 1, an example of the automatically generated model 117 for Algorithm 1 is presented herein below. After automatic rewriting utilizing temporary variables for individual floating-point operations, and removal of constants $c_1=0.0$ and $c_2=1.0$ and associated computations that do not require rounding, the computation is split into the following sequence in Table 2.

TABLE 2 float a1b2 = a1*b2;
float a2b1 = a2*b1;
float denom = a2b1−a1b2;
float x = b1 / denom;

The model checker 118 can analyze each computation step for stability as follows: the computation step is deemed stable if it results in an interval with numeric bounds and produces a small interval; otherwise the computation step is deemed unstable and witness trace should be reported. The small interval, for example, may be defined to have a small relative error of 0.1%. That is, after each operation, the result can be checked using the method checkStability(x) defined here, assuming x≠0, as:

$$\text{checkStability}(x) := \check{x} = \text{Number} \land \hat{x} = \text{Number} \land \left|\frac{\overline{x} - x}{x}\right| < 10^{-3}$$

The checkStability function is one means by which the model checker 118 can employ specifications including one or more modeling variables, as discussed further herein below. A user may write additional specifications using modeling variables, as discussed herein below.

The automatically generated model for the first three steps of the simplified program of Table 2 is shown below in Algorithm 2 of Table 3 herein below.

TABLE 3

Algorithm 2 Simplified model for motivating example of Algorithm 1

1: procedure MODEL
2:   a1 = ↓ (37,639,840)
3:   ā1 = ↑ (37,639,840)
4:   a2 = ↓ (29,180,479)
5:   ā2 = ↑ (29,180,479)
6:   b1 = ↓ (−46,099,201)
7:   b̄1 = ↑ (−46,099,201)
8:   b2 = ↓ (−35,738,642)
9:   b̄2 = ↑ (−35,738,642)
10:  ǎ1 = â1 = ǎ2 = â2 = Number
11:  b̌1 = b̂1 = b̌2 = b̂2 = Number
12:  a1b2 = ↓ min(a1 · b2,a1 · b̄2,ā1 · b2,ā1 · b̄2)
13:  ā1b2 = ↑ max(a1 · b2,a1 · b̄2,ā1 · b2,ā1 · b̄2)
14:  a1b̌2 = $L_M$ (a1, ā1, ǎ1, â1, b2, b̄2, b̌2, b̂2)
15:  a1b2 = $U_M$ (a1, ā1, ǎ1, â1, b2, b̄2, b̌2, b̂2)
16:  assert( checkStability(a1b2) )
17:  a2b1 = ↓ min(a2 · b1,a2 · b̄1,ā2 · b1,ā2 · b̄1)
18:  ā2b1 = ↑ max(a2 · b1,a2 · b̄1,ā2 · b1,ā2 · b̄1)
19:  a2b1 = $L_M$ (a2,ā2,ǎ2,â2,b1,b̄1,b̌1,b̂1)
20:  a2b1 = $U_M$ (a2,ā2,ǎ2,â2,b1,b̄1,b̌1,b̂1)

TABLE 3-continued

Algorithm 2 Simplified model for motivating example of Algorithm 1

21:    assert( checkStability(a2b1) )
22:    denom =↓ (a2b1 − $\overline{a1b2}$)
23:    $\overline{denom}$ =↑ ($\overline{a2b1}$ − a1b2)
24:    deňom = $L_S$ (a2b1,a2b̌1,$\overline{a1b2}$,a1b̌2)
25:    deňom = $U_S$ ($\overline{a2b1}$,a2b̌1,a1b2,a1b̌2)
26:    assert( checkStability(denom) )
27: end procedure As shown in Table 3, the semantic lowering module 114 can use the pre-defined macro checkStability(x) to add assertions that may be checked by the model checker 118, which is, in turn, configured to provide a witness trace for any unstable computation found. For simplification purposes and ease of understanding, the last step involving the division and the definitions for the updates to the floating-point status variables for multiplication operations $L_M$ and $U_M$ and for subtraction operations $L_S$ and $U_S$ are omitted. The updates for subtraction are similar to those presented above for addition in the discussion of the floating point operation z:=x+$_F$y. While the definition of the updates for multiplication are much more complex, as stated above, a priori computed invariants can simplify these updates considerably.

The computations of a1b2 and a2b1 have been deemed to be stable by the analysis. Using an exemplary model checker 118, described in more detail below, the computation time for each step is marginal, taking 0.9 s and 1.0 s, respectively. For the computation of denom, the analysis found that the result is potentially unstable due to cancelation effects. The model checker reported a potential witness at depth 18 in 6.0 s (line 26). It showed a witness, where the lower bound of denom is negative, while the upper bound is positive. The witness produced by the model checker can be interpreted as indicating that an interval may not be maximal. In this case, the model checker produced the answer that denom may be within $\lfloor -4.8 \times 10^{13}, 5.0 \times 10^{-38} \rfloor$. Note that mathematically speaking the value of denom is −1.

Since denom is then used as a denominator in a division, the resulting status flags for x become ±Inf, which is also defined to be an unstable computation in the assertion. The model checker found a witness for this check at depth 23 after 22.4 s. In the witness trace for this property, the range found for denom is $\lfloor -8.0 \times 10^{12}, 2.2 \times 10^{10} \rfloor$, causing the following values for the status flags of x:x̌=−Inf,x̂=Inf.

Returning to abstract interpretation block 110, as mentioned above, providing an a priori abstract interpretation stage can be employed in block 110 to simplify the model before it is passed on to the model checker 118. For example, statements related to the floating-point status flags can be simplified by setting f̌,f̂∈F to Number.

To illustrate the simplification provided by an a priori abstract interpretation stage, an example shown in Algorithm 3 of Table 4 below is considered. Algorithm 3 computes the sum of an array with unknown data of type integer (int) and unknown array length. In this example, the model checker 118 is asked to generate a large enough array and integer contents so that the sum of the array is bigger than a target floating-point number. By increasing the target number, the model checker can generate bigger arrays and longer witness traces.

TABLE 4

Algorithm 3 Integer array sum

Require: length(A) ≧ n
Require: target is numeric
1: procedure TESTSUM(int A[ ] , int n , float target)
2:    float sum = 0.0f
3:    for int i = 0 to n − 1 do
4:        float tmp = (float) A[i]
5:        sum += tmp
6:        assert(sum <target)
7:    end for
8: end procedure The sum is computed using a loop that walks the array. Each loop iteration includes two rounding operations. First, an integer can be cast to a floating-point. Second, two floating-points can be added. While the program does not include any multiplication, the rounding modes using ↑ and ↓ introduces a number of scalar multipliers per loop iteration. The discussion set forth above provide a definition of ↑ and ↓ utilizing the scalar multiplication in ↑$_n$ and ↓$_n$.

Using an a priori abstract interpretation stage, the model can be simplified in that it propagates the fact that all floating-point variables are always of status Number in the model, thus permitting constant folding to eliminate status flags from the resulting model. These simplifications are valid in that this constraint is indeed an invariant of the system, for small enough target values resulting in small enough n. However, the model checker 118 may have to discover this fact during its analysis. It can be shown that employing the simplified model can result in the discovery of longer witness traces in a shorter time period in comparison to a model that does not employ the simplified floating-point status flags.

In addition to up-front simplification on the floating-point status flags, the a priori abstract interpretation stage of block 110 can simplify assignments to other modeling variables. In particular, abstract interpretation block 110 can simplify the ITEs used in assignments to f,f̂ for some program variable f. For example, additional information about pre-computed invariants can be utilized by simplifying the nested ITE structures. Here, any one or more of the following simplifications can be made: a) assignments can be simplified by predicting the sign of the result of a computation, which permits simplification of rounding operations ↑,↓; b) assignments due to modeling of multiplication that include min and max functions can be simplified; and/or c) assignments due to modeling of rounding can be simplified by predicting whether the result of a computation is a sub-normal number. It can be shown that a priori computed invariants generated by abstract interpretation can significantly improve model checker performance by providing model simplifications. It should be noted that the invariants can sometimes validate certain properties, which can be removed before using the model checker 118. Additionally, it should also be understood that user-provided invariants may also be utilized to simplify the generated model.

Returning again to the model checker 118, several different types of analysis models for backend solver infrastructures can be employed. As noted above, F-SOFT can be used as a platform to implement model generator 106, which may be configured to control-flow graph representation 108 over integer variables and variables in the real domain. These models may be analyzed in the back-end by different types of model checkers that reason about non-linear mixed integer and real constraints. As mentioned above, an exemplary model checker 118 can be configured to perform bounded model checking using SMT-solvers and can prove some model properties in certain instances.

An exemplary model checker may utilize CORDIC (Coordinate Rotation Digital Computer) algorithms to translate nonlinear arithmetic into linear arithmetic given some precision requirement. These algorithms are introduced to compute transcendental and algebraic functions using only adders and shifters in a finite recursive formulation. The number of recursive steps is determined by the accuracy specifications. On the translated formula, a DPLL (Davis-Putnam-Logemann-Loveland) Algorithm-style interval search engine is utilized to explore all combinations of interval bounds. The search engine uses a SMT (LRA) (Satisfiability Modulo Theory for Linear Real Arithmetic) solver such as Yices to check the feasibility of a particular interval bound combination in conjunction with the linearized formula in an incremental fashion. To ensure soundness, the exemplary model checker can use infinite-precision arithmetic which can cause significant slowdown when computations require complex rational representation. It should be noted that, in addition to generation of models, exemplary embodiments of the present invention can also generate non-linear SMT-LIB-compliant models.

Returning now to block 122 of FIG. 1, the generated model 117 on which model checking can be performed may be refined at block 122. According to one exemplary implementation of the present invention, the refinement module 122 can be configured to refine the generated model using counterexample guided abstraction. Here, the parametric constants of model 117 can be refined to obtain improved models. For example, the abstract interpretation module 110 can be configured to select relatively large values for the parametric constant $\delta$ or $\delta_t$ that is provided in model 116 by the semantic lowering block 114, and in turn, included in the model 117 generated for model checking purposes. After model checking the generated model 117, counterexamples/witness traces 120 can be reported and provided to the refinement module 122, which can thereafter selectively reduce the value of one or more of the parametric constants based on spurious counterexamples included in report 120. The refinement block 122 can find spurious counterexamples by determining the feasibility of witness traces on model 117. For relatively infeasible paths, the refinement module 116 can decrease the corresponding parametric constant(s) to correct for overly imprecise modeling of floating point operations. After adjusting the value of the parametric constants in the model 117, the refinement block 122 can provide a refined model 117 to the model checker 118, which, in turn, may provide counterexamples/witness traces 120 for the refined model. The refinement module 122 may then receive the updated witness traces 120 and the process can be iterated until optimal values for the parametric constants are obtained. Thereafter, the final counterexample/witness trace report 120 can be output to a user. It should be noted that the refinement process can be combined with other abstract-refinement based techniques, such as predicate abstraction.

Additionally or alternatively, system/method 100 can include adding user-defined properties to properties 119 at block 121. For example, at block 121, a user can access modeling variables provided by the semantic lowering block 114 and write properties of interest to be added to properties 119 and accessed and checked by the model checker 118. In particular, the user-defined properties of interest can be defined in terms of one or more the modeling variables. It should be noted that these and other properties can be defined and written as reachability properties that can be handled by system 100. In addition, although properties 119 have been described as being comprised of properties automatically generated by system/method 100 and user-defined properties, properties 119 may be composed exclusively of either properties automatically generated by system/method 100 or user-defined properties.

In accordance with exemplary aspects of the present invention discussed herein above, an arbitrary C program with floating-point operations can be transformed using a modified F-SOFT infrastructure into a CFG representation that only contains variables of integral type and real variables. Based on this representation, the CFG can be translated into a model for backend solvers to soundly analyze precision loss of computations performed by the program. Further, the translation can be based on adding a program counter variable that is modeled as an integer ranging over the (numbered) nodes of the CFG.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for verifying a program that utilizes floating point operations implemented by a processor employing a storage medium, the method comprising:
    modeling the variability in values of floating point variables and operations in the program by employing validation arithmetics to generate modeling variables, composed of at least one of reals and integers, for the floating point variables, wherein the modeling further comprises employing interval arithmetic to generate rounding functions for sub-normal numbers by introducing a sub-normal parametric error constant for at least one floating point operation precision type and for at least one sub-normal number range of the at least one floating point operation precision type, and wherein the sub-normal error constant is greater than or equal to the largest absolute error in the at least one sub-normal number range;
    generating a model for the program based on the modeling variables;
    performing model checking on the generated model to determine whether there are program instabilities due to loss of precision in floating point representation and operations in the program; and
    reporting error traces for any program instabilities found by the model checking.

2. The method of claim 1, wherein the modeling further comprises performing updates to modeling variables corresponding to arithmetic floating point operations in the program.

3. The method of claim 2, wherein the performing updates includes casting the modeling variables between different floating point precision types.

4. The method of claim 2, wherein the method further comprises:
    performing abstract interpretation to find over-approximations for modeling variables and to simplify the updates.

5. The method of claim 1, wherein the modeling variables include interval bound variables for each floating point variable delineating the variability of the value of the floating point variable.

6. The method of claim 5, wherein the modeling further comprises introducing a floating point status variable for each interval bound variable indicating whether the interval bound variable is a number, not a number, negative infinity, or positive infinity.

7. The method of claim 1, wherein the modeling further comprises employing interval arithmetic to introduce parametric error constants in the model to implement rounding in floating point operations.

8. The method of claim 7, wherein the value of at least one of the parametric error constants is increased based on a user-specified threshold.

9. The method of claim 1, wherein the modeling further comprises employing interval arithmetic to generate rounding functions for normalized numbers by introducing a parametric error constant for each floating point operation precision type that is greater than or equal to the worst-case relative error for the corresponding precision type.

10. The method of claim 9, wherein the modeling further comprises combining a rounding function for normalized numbers with a rounding function for sub-normal numbers to generate a universal rounding function expression.

11. The method of claim 1, wherein the model checking further comprises employing specifications including one or more of the modeling variables.

12. The method of claim 1, further comprising:
refining the generated model using counterexample-guided abstraction.

13. The method of claim 12, wherein the modeling further comprises introducing parametric constants in the model that account for variability of at least one of the modeling variables, and wherein the refining further comprises reducing the value of at least one of the parametric constants based on at least one spurious counterexample, wherein a spurious counterexample is determined by assessing the feasibility of one or more of the reported witness traces.

14. The method of claim 13, wherein the refining further comprises performing predicate abstraction on one or more variables in the generated model.

15. The method of claim 1, wherein the method comprises:
adding properties that are defined by a user in terms of the modeling variables, wherein the model checking comprises assessing the properties.

16. The method of claim 1, wherein the generated model is a second model and wherein the method further comprises:

generating a first model of the program based on source code; and performing abstract interpretation using affine arithmetic to analyze floating point variables and operations in the first model, wherein the generating the second model comprises employing interval arithmetic to generate the second model based on the abstract interpretation analysis.

17. A system for verifying a program that utilizes floating point operations implemented by a processor employing a storage medium, the system comprising:
a semantic lowering module configured to model the variability in values of floating point variables and operations in the program by employing validation arithmetics to generate modeling variables, composed of at least one of reals and integers, for the floating point variables, wherein the semantic lowering module is further configured to employ interval arithmetic to generate rounding functions for sub-normal numbers by introducing a sub-normal parametric error constant for at least one floating point operation precision type and for at least one sub-normal number range of the at least one floating point operation precision type, wherein the sub-normal error constant is greater than or equal to the largest absolute error in the at least one sub-normal number range; and
a model checker configured to generate a model for the program based on the modeling variables, to perform model checking on the generated model to determine whether there are program instabilities due to loss of precision in floating point representation and operations in the program, and to report error traces for any program instabilities found.

18. The system of claim 17, wherein the generated model is a second model and wherein the system further comprises:
a model builder configured to generate a first model of the program based on source code; and
an abstract interpretation module configured to perform abstract interpretation on the first model using affine arithmetic to analyze floating point variables and operations, wherein the model checker is configured to generate the second model by employing interval arithmetic based on the abstract interpretation analysis.

19. The system of claim 17, wherein the model checker employs bounded model checking or employs a Satisfiability Modulo Theory solver for bounded model checking.

* * * * *